(12) United States Patent
Arbabi et al.

(10) Patent No.: US 9,453,947 B2
(45) Date of Patent: Sep. 27, 2016

(54) FLAT RETROREFLECTORS

(71) Applicant: CALIFORNIA INSTITUTE OF TECHNOLOGY, Pasadena, CA (US)

(72) Inventors: Amir Arbabi, Pasadena, CA (US); Andrei Faraon, La Canada Flintridge, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 20 days.

(21) Appl. No.: 14/558,201

(22) Filed: Dec. 2, 2014

(65) Prior Publication Data
US 2015/0160384 A1 Jun. 11, 2015

Related U.S. Application Data

(60) Provisional application No. 61/911,046, filed on Dec. 3, 2013.

(51) Int. Cl.
| | |
|---|---|
| *G02F 1/01* | (2006.01) |
| *G02B 5/13* | (2006.01) |
| *G02B 5/136* | (2006.01) |
| *H04B 10/50* | (2013.01) |
| *H04B 10/40* | (2013.01) |

(52) U.S. Cl.
CPC ............... *G02B 5/13* (2013.01); *G02B 5/136* (2013.01); *H04B 10/40* (2013.01); *H04B 10/501* (2013.01)

(58) Field of Classification Search
CPC ... G02F 1/01; G02B 26/0816; G02B 26/001; G02B 5/136; G02B 5/12; G02B 3/00; H04B 10/501; H04B 10/40; B60R 1/12
USPC ....... 359/238, 246, 251, 276, 279, 355, 529, 359/542, 534, 515, 642, 838, 904
See application file for complete search history.

(56) References Cited

U.S. PATENT DOCUMENTS

2012/0099199 A1* 4/2012 Vasylyev ......... B29D 11/00278
359/530

OTHER PUBLICATIONS

Lu, F. et al. "Planar high-numerical-aperture low-loss focusing reflectors and lenses using subwavelength high contract gratings" *Optics Express* vol. 18, No. 12 (2010) pp. 12606-12614.
Fattal, D. et al. "Flat dielectric grating reflectors with focusing abilities" *Nature Photonics Letters* (2010) pp. 1-5.
Rabinovich, W.S. et al. "InGaAs multiple quantum well modulating retro-reflector for free space optical communications" *Proceedings of SPIE* vol. 4489 (2002) pp. 190-201.
Rabinovich, W.S. "A cat's eye multiple quantum-well modulating retro-reflector" *IEEE Photonics Technology Letters* vol. 15, No. 3 (2003) pp. 461-463.

* cited by examiner

*Primary Examiner* — Tuyen Tra
(74) *Attorney, Agent, or Firm* — Steinfl & Bruno LLP (57) ABSTRACT

A retroreflector device is described, which includes a lens component operable for focusing radiation, which is incident thereto at an angle of incidence. The retroreflector also includes a mirror component operable for reflecting the radiation focused by the lens component back along the angle of incidence. The lens component and/or the mirror component includes a quasi-periodic array of elements, each of which comprises a dimension smaller than a wavelength of the radiation.

19 Claims, 9 Drawing Sheets

FLAT RETROREFLECTORS

CROSS REFERENCE TO RELATED APPLICATIONS

The present application claims priority to U.S. Provisional Patent Application No. 61/911,046 filed Dec. 3, 2013, which is incorporated herein by reference in its entirety.

STATEMENT OF U.S. GOVERNMENT INTEREST

The invention described herein was made in the performance of work under a NASA contract, and is subject to the provisions of Public Law No. 96-517 (35 U.S.C. §202), in which the Contractor has elected to retain title.

FIELD

The present disclosure relates generally to optical devices. More particularly, an example embodiment of the present invention relates to optical retroreflector devices.

SUMMARY

Example embodiments of the present disclosure relate to optical retroreflector devices. Retroreflector devices are also referred to herein synonymously and/or interchangeably as retroflectors. An example embodiment may be implemented in which a retroreflector device is fabricated using a binary lithography process on flat substrates. Retroflectors thus fabricated may be incorporated with other optical components such as optical modulators.

An example embodiment thus implements retroflectors, such as those of the cat's eye type or related varieties, which have a focusing lens or unit elements thereof comprising an array of various sizes and/or shapes of lattice structures or unit elements thereof, and are disposed over a flat substrate. The retroreflectors have high reflection efficiencies and are quickly and easily applied over a surface.

In an example embodiment, the retroreflector is integrated with an optical modulator, e.g., as a component of a remote transceiver and/or transmitter, which may be mounted on a satellite, an aircraft or another vehicle or used in various other applications. The size, weight, form factor and other features of the retroreflector allow integration with the optical modulator.

An example embodiment of the present disclosure relates to a retroreflector device. The retroreflector comprises a lens component operable for focusing radiation, which is incident thereto at an angle of incidence. The retroreflector also comprises a mirror component operable for reflecting the radiation focused by the lens component back along the angle of incidence. The lens component and/or the mirror component comprise a quasi-periodic array of elements, each of which comprises a dimension smaller than a wavelength of the radiation.

In an example embodiment, the retroreflector further comprises an optical modulator component integrated therewith, e.g., monolithically or with a hybrid technique. The modulator component is operable for performing a function as a transmitter and/or a transceiver.

The modulator component may be disposed externally or internally in relation to the retroreflector device with which it is integrated. The modulator component may be operable for performing an optical modulation function, which relates to amplitude modulation, phase modulation and/or polarization of radiation incident to the retroreflector.

In an example embodiment, the lens component and/or the mirror component of the retroreflector are disposed on a semiconductor substrate such as silicon. An example embodiment may implement a retroreflector device that is operable optically over a range of wavelengths corresponding to an infrared spectral range.

The semiconductor substrate may comprise a material with a high refractive index over the infrared spectral range, such as silicon. A material of low refractive index at infrared wavelengths, such as silicon dioxide, may also be used in the retroflector.

The optical operating range of the retroreflector device comprises a range of wavelengths over which the retroreflector functions efficiently. The optical operating range relates to a parameter associated with a characteristic of the lens component and/or the mirror component. The parameter of the lens and/or mirror may relate to a size and/or a shape of a lattice associated with one or more of the lens component or the mirror component.

The parameter of the lens and/or mirror may relate to a size and/or a shape of each of multiple unit elements, which comprise the lattice. The retroreflector may be operable over one or more frequency ranges of the electromagnetic spectrum (e.g., radio, microwave, Terahertz, infrared, visible, ultraviolet, and/or an x-ray). An example embodiment is also described in relation to a method for fabricating a retroreflector.

An example embodiment of the present disclosure relates to a flat and low profile retroreflector which reflects back a substantial portion of the incident radiation along the direction of incident.

An example embodiment of the present disclosure relates to a retroreflector, which can be mass produced using conventional micro-fabrication techniques and binary lithography.

The present disclosure provides a retroreflector fabricated on a flat substrate that can be readily integrated with optical components such as optical amplitude, phase, or polarization modulators.

In an example embodiment of the present disclosure, a retroreflector comprises a flat lens and a flat mirror which are separated from each other by a spacer layer. The spacer layer is substantially transparent at the operating wavelength of the retroreflector.

In an example embodiment, one or more of a lens component and/or a mirror component may be implemented with a gradual change of optical parameters thereof over a one dimensional, or a two dimensional, periodic structure in which a quasi-periodic structure is formed.

In an example embodiment, an optical transceiver apparatus is implemented by integration of an optical modulator component and a photodetector component.

In an example embodiment, a retroreflector device is implemented, which is operable over any parts or portions of the electromagnetic spectrum, including over one or more microwave, Terahertz, infrared, visible, or ultraviolet (even x-ray) wavelength ranges.

A flat retroreflector in a cat's eye configuration focuses the light using a lens. The focused light is reflected back off a focusing flat mirror. The focusing lens is flat and is composed of a quasi-periodic array of materials with high refractive index surrounded by materials of lower refractive index. The flat mirror is also composed of a quasi-periodic array of materials with high index contrast compared to its surroundings.

In an example embodiment of the present disclosure, a retroreflector that reflects back a portion of the incident radiation along the incident angle is composed of a lens and a mirror, and at least one of them is realized using a quasi-periodic array of sub-wavelength elements.

In an example embodiment, a retroreflector modulator transmitter and/or transceiver uses, and/or is integrated with, the retroreflector. In an example embodiment, the modulator is located outside of the retroreflector. In an example embodiment, the modulator is integrated either monolithically or using hybrid integration techniques with the retroreflector. In an example embodiment, the modulator may also comprise an integral part of the retroreflector.

In an example embodiment, the retroreflector is operable in the infrared spectral range or another spectral range, without limitation. In an example embodiment, the retroreflector may be disposed on a semiconductor substrate such as silicon or another semiconductor.

BRIEF DESCRIPTION OF THE DRAWINGS

In relation to the following description of example embodiments, each figure of the drawings comprises a part of the specification of the present Application, no particular scale applies (unless stated particularly otherwise, e.g., the wavelength scales of both of the axes shown in FIG. 5-FIG. 6, inclusive), and.

DESCRIPTION OF EXAMPLE EMBODIMENTS

Retroreflector devices retroreflect light. As used herein, the term retroreflect relates to reflecting a significant portion of light, which is incident to a retroreflector, back to the source of the incident light (light source). Retroreflectors are also sometimes referred to as 'retroflectors,' 'retroreflect' as 'retroflect' and/or 'retroreflection' as 'retroflection,' etc., and these terms may be used respectively herein as interchangeable and/or synonymous. Familiar types of retroreflectors include 'corner cube' retroflector devices and 'cat's eye' retroflector devices.

Corner cube retroreflectors typically comprise three reflecting surfaces, which are mutually perpendicular to each other. Corner cube retroflectors may thus be conceptualized by picturing reflective surfaces arrayed in a configuration not dissimilar to those of inner surfaces which contour the planar regions approaching a corner of a cube surface, such as corners in a cubic prism. Corner cube retroflectors typically have high efficiencies for retroreflection over a wide range of angles of incident light, e.g., angles scribed by light, which is incident to the retroflector.

Corner cube retroflectors have useful applications in optics and free space optical communications. Corner cube retroflectors used in these applications are made by coating the outer surfaces of a corner made of glass or other transparent materials with a reflective material. Corner cube retroflectors may also comprise polymers and/or layers of plastics, which are arrayed over an assembly of multiple corner cubes used for making road signs and night safety signs, which reflect light emitted by headlights, searchlights or flashlights back toward its sources.

Cat's eye retroreflectors typically comprise a focusing lens and a concave mirror. Cat's eye retroflectors may be implemented with a combined telescopic lens and flat mirror approach [Ref. 1]. Cat's eye retroflectors may also be implemented by coating a portion or an array of small glass beads, plastic beads or micro-spheres with a material, when applied thereto in such a coating, forms a highly reflective surface.

The beads, micro-spheres or the like may be embedded in a thin sheet of plastic, paint or adhesive for use in retroreflective coatings. While such retroreflective coatings may be quickly and easily applied over a surface, the retroreflection efficiency thereof may be limited, e.g., in relation to corner cube retroflectors.

For free space communication applications, a retroreflector may be integrated with an optical modulator, e.g., as an optical device component of a remote transceiver and/or mounted on a satellite, an aircraft or another vehicle. In such applications, size, weight, form factor and/or other features may be significant to the ability of a retroreflector component to integrate with an optical modulator. [Ref. 2]

Modern optical modulators may be disposed over a flat substrate, e.g., as described in U.S. Pat. No. 6,154,299 to Gilbreath, et al., which is incorporated herein for background information. Corner cube type retroflector components are typically integrated with such optical transceivers.

However, the corner cube retroreflector components typically used with such transceivers unfortunately contribute significantly to the size and weight of the integrated transceiver and retroreflector assembly.

An example embodiment of the present disclosure is described in relation to a retroreflector device. The retroreflector comprises a lens component operable for focusing radiation, which is incident thereto at an angle of incidence. The retroreflector also comprises a mirror component operable for reflecting the radiation focused by the lens component back along the angle of incidence. The lens component and/or the mirror component comprise a quasi-periodic array of elements, each of which comprises a dimension smaller than a wavelength of the radiation.

Retroreflector devices are also referred to herein synonymously and/or interchangeably as retroflectors. An example embodiment may be implemented in which a retroreflector device is fabricated using a binary lithography process on flat substrates. Retroflectors thus fabricated may be incorporated with other optical components such as optical modulators.

Figure 1:
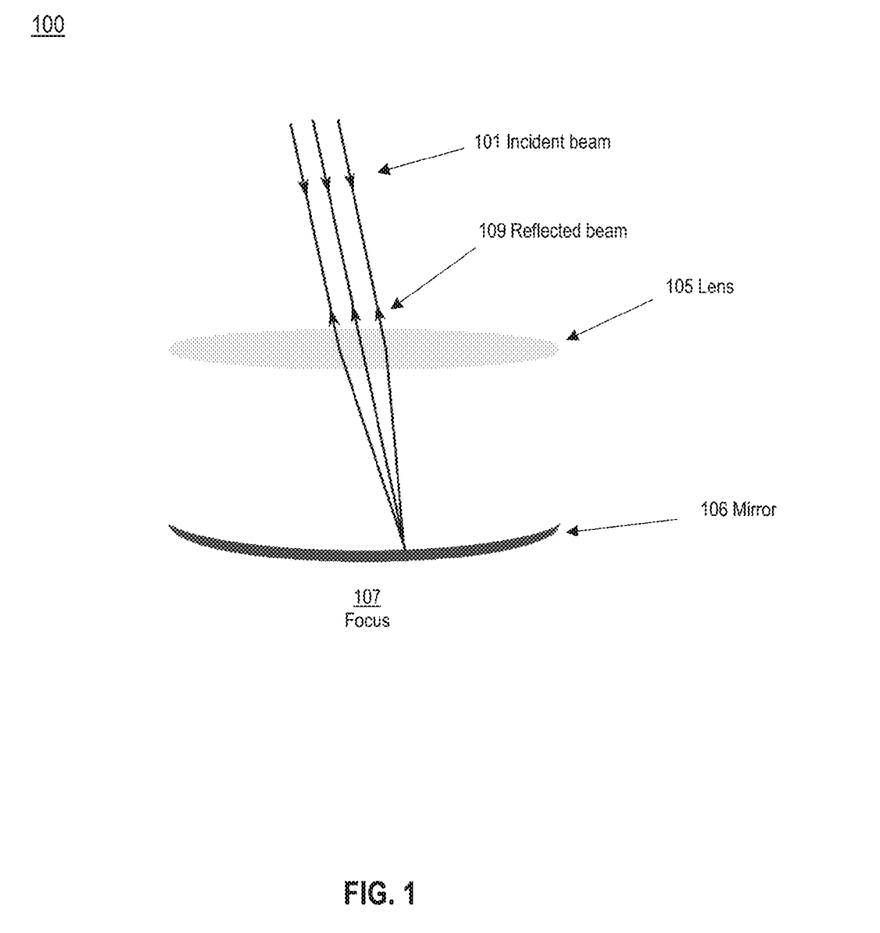
FIG. 1 depicts an example cat's eye retroreflector device.

FIG. 1 depicts an example cat's eye type retroflector 100. Light 101 incident to the retroflector 100 is focused by the lens 105 at the mirror position 107 and is reflected back by the mirror 106 along the incident angle 109. In an example embodiment, a retroflector operable as shown with reference to FIG. 1 is implemented.

Figure 2:
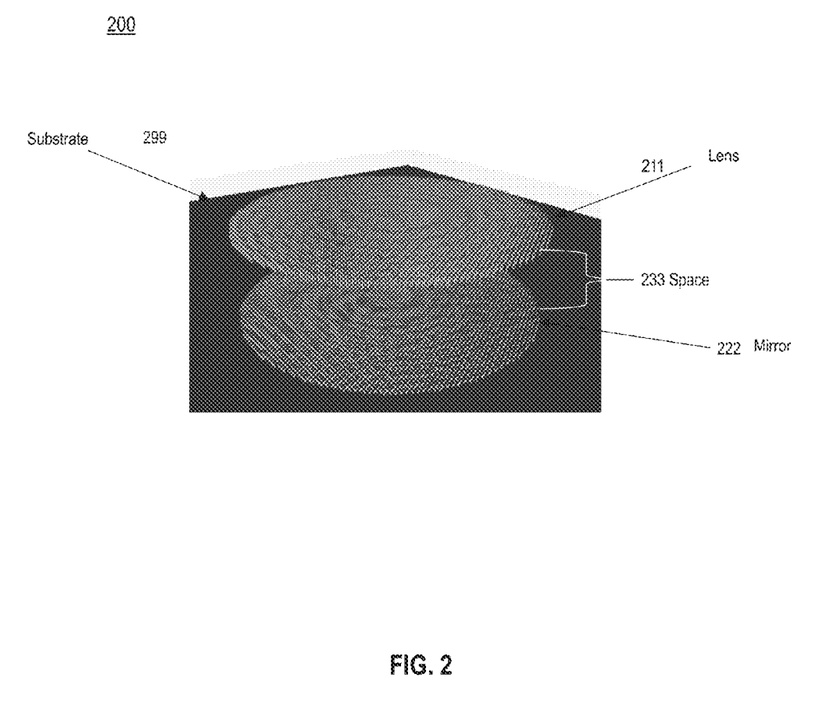
FIG. 2 depicts an example retroreflector device, according to an embodiment of the present disclosure.

FIG. 2 depicts an example retroreflector device 200, according to an embodiment of the present disclosure. Example retroreflector device 200 comprises a flat lens 211 and a flat mirror 222, which are disposed in a substrate 299. An optically transparent spacer layer 233 separates the flat lens 211 and the flat mirror 222.

As used in this sense, the term "transparent" refers to a property (e.g., transmissivity) of the spacer 233, which for a frequency range over which the retroreflector 200 is operable optically, allows for transmission through spacer 233 of substantially all light incident on a surface thereof without significant optical loss therein (e.g., from absorption or reflection).

In an example embodiment, the flat lens 211 and/or the flat mirror 222 are implemented by patterning a layer of material having a high refractive index in a quasi-periodic array.

As depicted in FIG. 2 for example, the lens 211 and the mirror 222 are implemented as a quasi-periodic array realized by gradual changes introduced over diameters of circular posts, which are patterned over a hexagonal lattice. Example embodiments may also be implemented with arrays comprising patterns of other types and kinds of lattice forms and/or unit cell elements. In an example embodiment, the flat lens and mirror may be implemented using quasi-periodic structures having one dimension.

In an example embodiment, the flat lens 211 may be implemented with a first quasi-periodic lattice shape and/or unit cell element, the flat mirror 222 may be implemented with a second quasi-periodic lattice shape and/or unit cell element, and the first quasi-periodic lattice shape and/or unit cell element may differ from the second quasi-periodic lattice shape and/or unit cell element. Thus, the quasi-periodic lattice shapes and unit cell elements used for implementing the lens 211 may be different from the lattice shapes and unit cell elements used for implementing the mirror 212.

Example embodiments are implemented in which the quasi-periodic structures comprise lattices of sizes that are small relative to wavelengths over the retroreflector's optical operating range, which prevents or deters scattering into higher orders of diffraction and related losses or inefficiencies. The phase and amplitude of reflection and transmission of a periodically patterned layer relate to (e.g., depend at least in part on) the size of the lattice.

Further, the reflection/transmission phase and amplitude relate to the shape(s) and size(s) of the elements inside each of the unit cells. An example embodiment of the present disclosure is implemented in which parameters of the periodic (e.g., quasi-periodic) layer change gradually.

Figure 3:
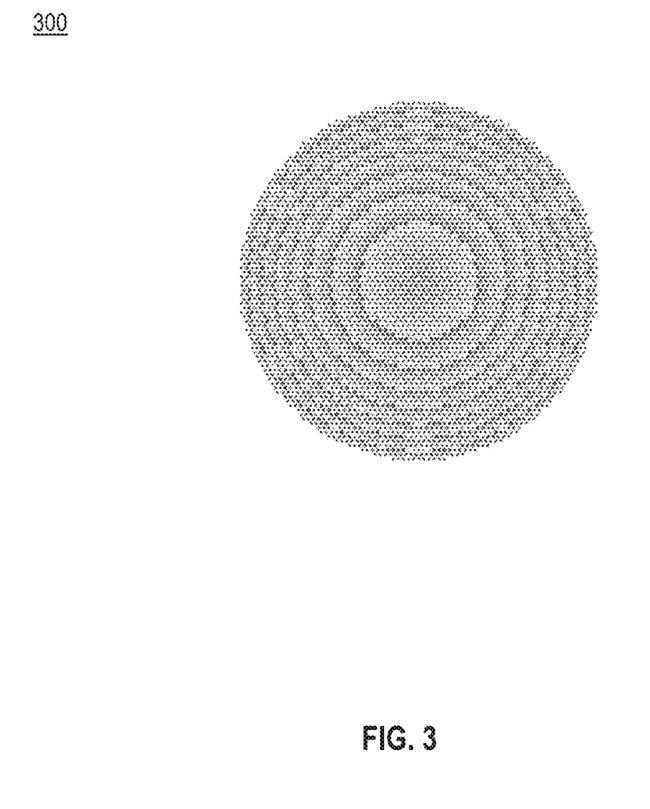
FIG. 3 depicts a top view of a quasi-periodic array of posts, which form an example lens or mirror according to an example embodiment.

For example, FIG. 3 depicts a top view of a quasi-periodic array of posts 300, which form a lens or mirror (e.g., lens 211, mirror 222; FIG. 2) according to an example embodiment. As shown in FIG. 3, parameters of the quasi-periodic layer change gradually, e.g., over the circumferential contours of each of the successively concentric rings. Thus, a quasi-periodic structure is implemented to have local transmission and reflection phases, which may be approximated by periodic structures having the same or similar parameters (e.g., layer thickness, lattice shape, element shape/size).

In an example embodiment, selective adjustments made over the thickness of the periodic layer (layer thickness), the shape of the lattice (lattice shape), and/or the shape and/or size of each of the elements thereof (element shape/size) implement full or partial control over the transmission or reflection amplitude or phase of a retroreflector.

The quasi-periodic structure characterizing the lens 211 implements an optical function similar to that performed by a convex lens design, which thus operates to focus radiation incident thereto (e.g., incident radiation). The quasi-periodic structure characterizing the mirror 222 implements an optical function similar to that performed by a concave mirror, which thus operates to reflect light incident thereon toward a focal point determined by a concavity characteristic of its surface.

The focal length of the lens 211 may approximate or be roughly equal to a radius of curvature of the concave mirror 222 implemented by the mirror's quasi-periodic structure. In an example embodiment, the distance of separation between the lens 211 and the mirror 222 is implemented to approximately equal the focal length of the lens and thus, adjusted to maximize the radiation reflected back along the incident direction.

An example embodiment is thus described in relation to a retroreflector device. The retroreflector comprises a lens component operable for focusing radiation, which is incident thereto at an angle of incidence. The retroreflector also comprises a mirror component operable for reflecting the radiation focused by the lens component back along the angle of incidence. The lens component and/or the mirror component comprise a quasi-periodic array of elements, each of which comprises a dimension smaller than a wavelength of the radiation.

Finite difference time domain simulation results of the set of Maxwell's equations computed for a Gaussian beam incident on a retroreflector (e.g., retroflector 200; FIG. 2) is shown in FIG. 5, FIG. 6 and/or FIG. 7.

Figure 5:
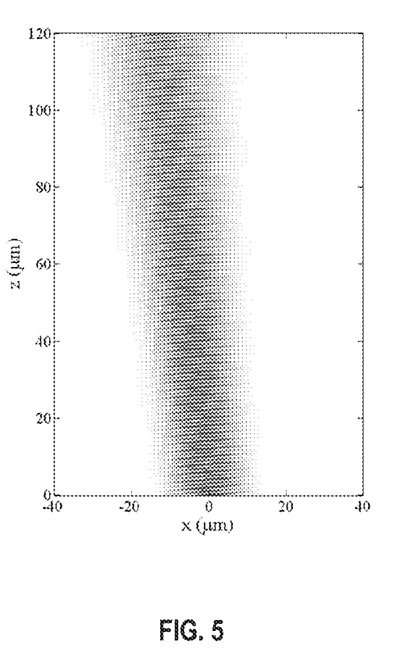
FIG. 5 depicts simulated values computed for an electric field associated with a Gaussian light beam incident on a retroreflector, which is implemented according to an example embodiment.

FIG. 5 depicts a plot of simulated values computed for an electric field, which is associated with a Gaussian light beam incident on a retroreflector implemented (e.g., as depicted in FIG. 2) according to an example embodiment. The electric field of the incident Gaussian beam is shown in FIG. 5. The beam's waist is close to the surface of the retroreflector.

Figure 6:
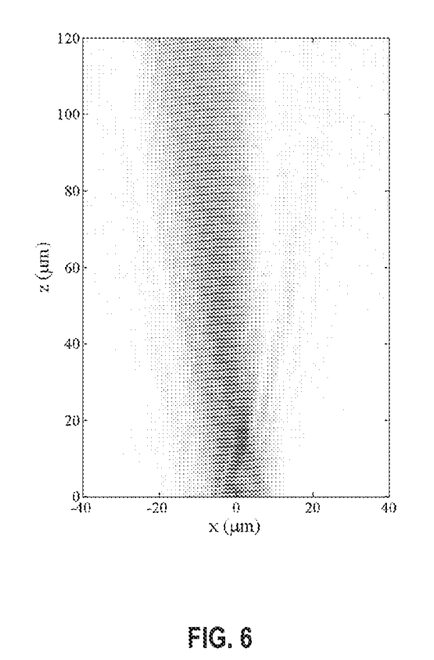
FIG. 6 depicts simulated values computed for an electric field of a Gaussian light beam reflected from a retroreflector device, which is implemented according to an example embodiment.

FIG. 6 depicts simulated values for an electric field of a Gaussian light beam reflected from a retroreflector device (e.g., implemented as depicted in FIG. 2 and in which the incident field corresponds to the Gaussian beam depicted in FIG. 5) according to an example embodiment. FIG. 6 shows the electric field of the reflected beam outside the retroreflector. The reflected beam is directed along the same angle as the incident beam.

Figure 7:
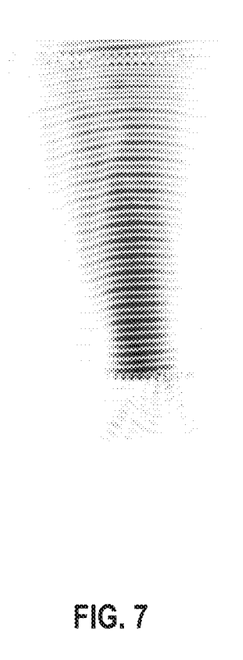
FIG. 7 depicts simulated values computed for a total electric field within a retroreflector, which is implemented according to an example embodiment.

FIG. 7 depicts simulated values for a total electric field within a retroreflector (e.g., as depicted in FIG. 2 and in which the incident field corresponds to the Gaussian beam shown in FIG. 5 and/or the reflected field depicted in FIG. 6) according to an example embodiment. The total electric field inside the retroreflector is shown in FIG. 7. As expected, the beam is focused by the lens layer and is reflected back by the mirror layer.

Figure 4:
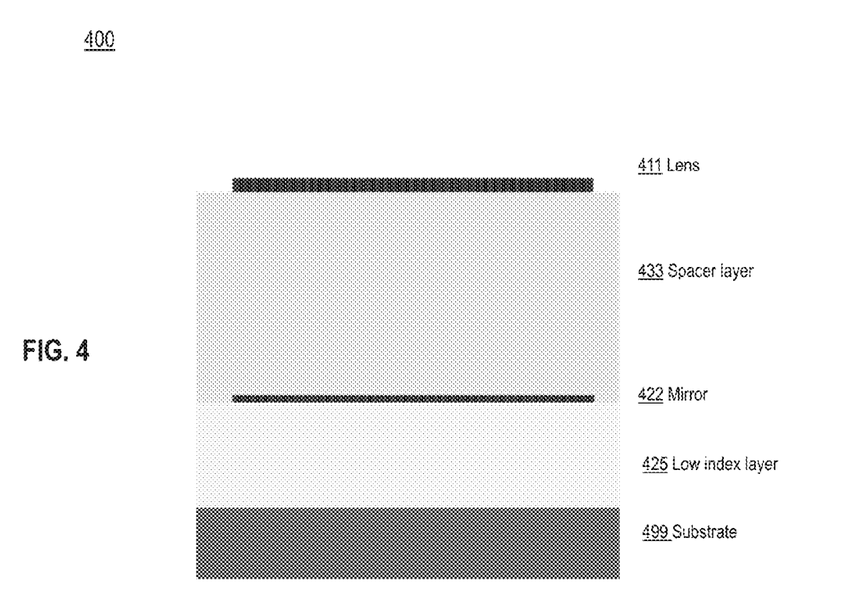
FIG. 4 depicts a side view of a retroreflector device, according to an example embodiment.

FIG. 4 depicts a side view of a retroreflector device 400, according to an example embodiment. An example embodiment of the present disclosure implemented for retroreflecting incident infrared radiation is fabricated on a silicon substrate 499. A low refractive index material 431 such as silicon dioxide is disposed beneath (e.g., underneath) the quasi-periodic structure corresponding to the mirror component 422.

The lens structure 411 and/or the mirror structure 422 may be implemented with a high refractive index material, such as silicon. A spacer layer 433, which is disposed between the lens 411 and the mirror 422 may comprise a polymeric material such as an SU-8 or other epoxy based or viscous polymers. Retroreflector device 400 may thus be mass produced using standard silicon micro-fabrication techniques familiar to artisans skilled in related technologies.

An example embodiment of the present disclosure thus relates to an optical retroreflector device. The retroreflector device may be disposed on a semiconductor or other flat substrate. The retroreflector device comprises a lens component operable for focusing radiation, which is incident thereto at an angle of incidence.

The retroreflector device also comprises a mirror component operable for reflecting the radiation focused by the lens component back along the angle of incidence. The lens component or the mirror component of the retroreflector comprises a quasi-periodic array of elements, each of which comprises a dimension smaller than a wavelength of the radiation within the operationally efficient wavelength range.

The retroreflector device also comprises a spacer component, which is transparent over the operationally efficient wavelength range and disposed between the lens component and the mirror component thereof. The retroreflector may further comprise a material, which has a low refractive index in relation to the operationally efficient wavelength range and is disposed over the semiconductor substrate beneath the mirror component in relation to the lens component.

Figure 8:
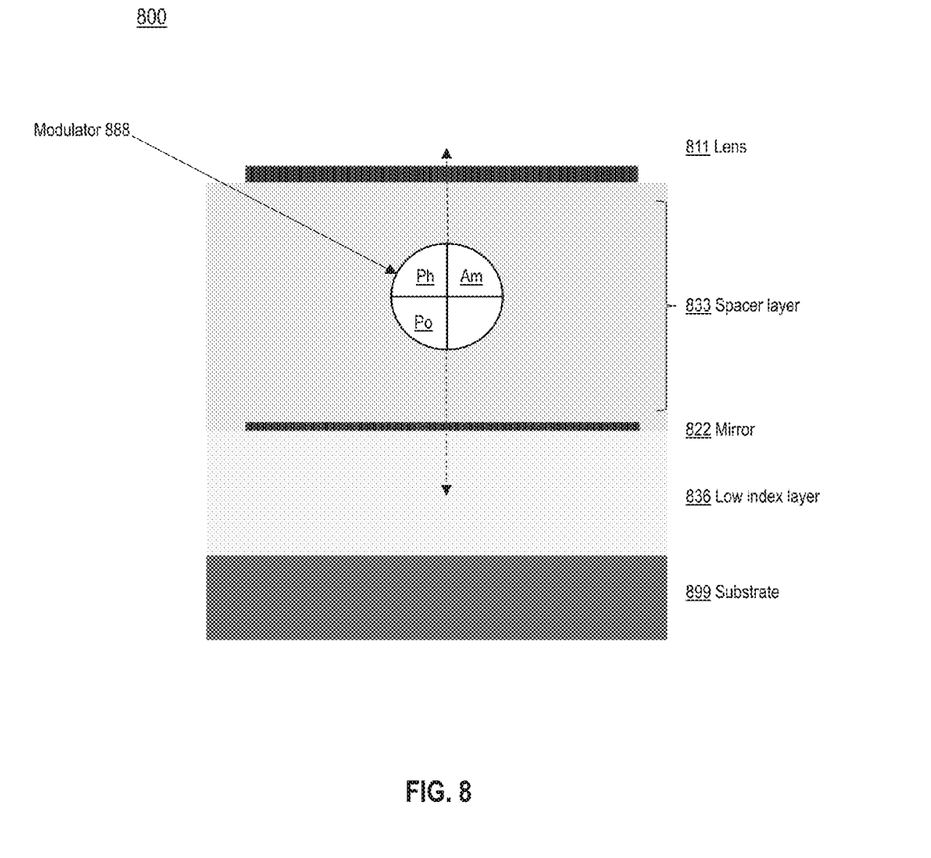
FIG. 8 depicts an example optical device, according to an example embodiment.

FIG. 8 depicts an example optical apparatus 800, according to an example embodiment of the present disclosure. The optical apparatus 800 is disposed over a substrate 899 and comprises a flat retroreflector device 844 (e.g., as described with reference to FIG. 2, FIG. 4, etc.) and a modulator device 888, which is integrated therewith. The modulator device 888 may perform one or more operations corresponding to amplitude, phase, or frequency modulation of at least a part of light reflected by the retroreflector device 844 with which it is integrated. Thus, modulator device 888 may comprise at least one of an amplitude modulator (Am), a phase modulator (Ph), or a polarization modulator (Po).

Integration of the modulator device 888 with the retroreflector device 844 may be implemented in the optical apparatus 800 with a separation of the modulator and retroflector devices from each other. Example embodiments may thus be implemented in which the modulator device 888 is placed outside in relation to the flat retroreflector device 888, in which the modulator is fabricated on top of the lens layer (e.g., using a monolithic integration platform or a hybrid integration platform).

An example embodiment may also be implemented in which the modulator is between the lens and the mirror. An example embodiment may be implemented in which the modulator 888 is combined with the lens, combined with the transparent spacer layer 833, or combined with the mirror in such that the transparent layer 833 (or the low refractive index layer 836) is operable to perform the modulation functionality in situ.

An example embodiment of the present disclosure thus relates to an optical apparatus. The optical apparatus comprises a retroreflector device disposed on a flat substrate having a high refractive index in relation to a range of frequencies over which the optical apparatus is efficient operationally. The apparatus' retroreflector device comprises a lens component operable for focusing radiation, which is incident thereto at an angle of incidence.

The retroreflector device also comprises a mirror component operable for reflecting the radiation focused by the lens component back along the angle of incidence. The lens component or the mirror component of the retroreflector comprises a quasi-periodic array of elements, each of which comprises a dimension smaller than a wavelength of the radiation within the operationally efficient wavelength range.

The apparatus' retroreflector device also comprises a spacer component, which is transparent over the operationally efficient wavelength range and disposed between the lens component and the mirror component thereof. The retroreflector may further comprise a material, which has a low refractive index in relation to the operationally efficient wavelength range and is disposed over the semiconductor substrate beneath the mirror component in relation to the lens component.

The optical apparatus also comprises an optical modulator transceiver or transmitter device integrated with the retroreflector device and operable over the operationally efficient wavelength range for performing one or more of amplitude, phase, or polarization related modulation of the incident radiation. The optical modulator device may be integrated with the retroreflector device monolithically or using hybrid integration. The modulator may be disposed externally in relation to the retroflector or internally (e.g., within the transparent spacer or low index components).

Example embodiments of the present disclosure may implement retroreflectors operable over one or more wavelength ranges of the electromagnetic spectrum without restriction. A flat retroreflector may thus be implemented to be operable in any part of the electromagnetic spectrum.

One or more operational features with which an example embodiment may be implemented may be described in relation to computations executed using Maxwell's equations. Operating wavelength(s) and wavelength ranges, as well as geometrical dimensions and related characteristics of the flat retroreflectors of example embodiments are fully scalable with full operational functionality.

Example embodiments are implemented using materials selected for the substrate, mirror, spacer, and lens layer components, which allow the retroreflector they comprise to operate in, or over, one or more wavelength ranges. The wavelength ranges may correspond to one or more of radio, microwave, Terahertz, infrared, visible, or ultraviolet (even x-ray), regions of the electromagnetic spectrum.

Figure 9:
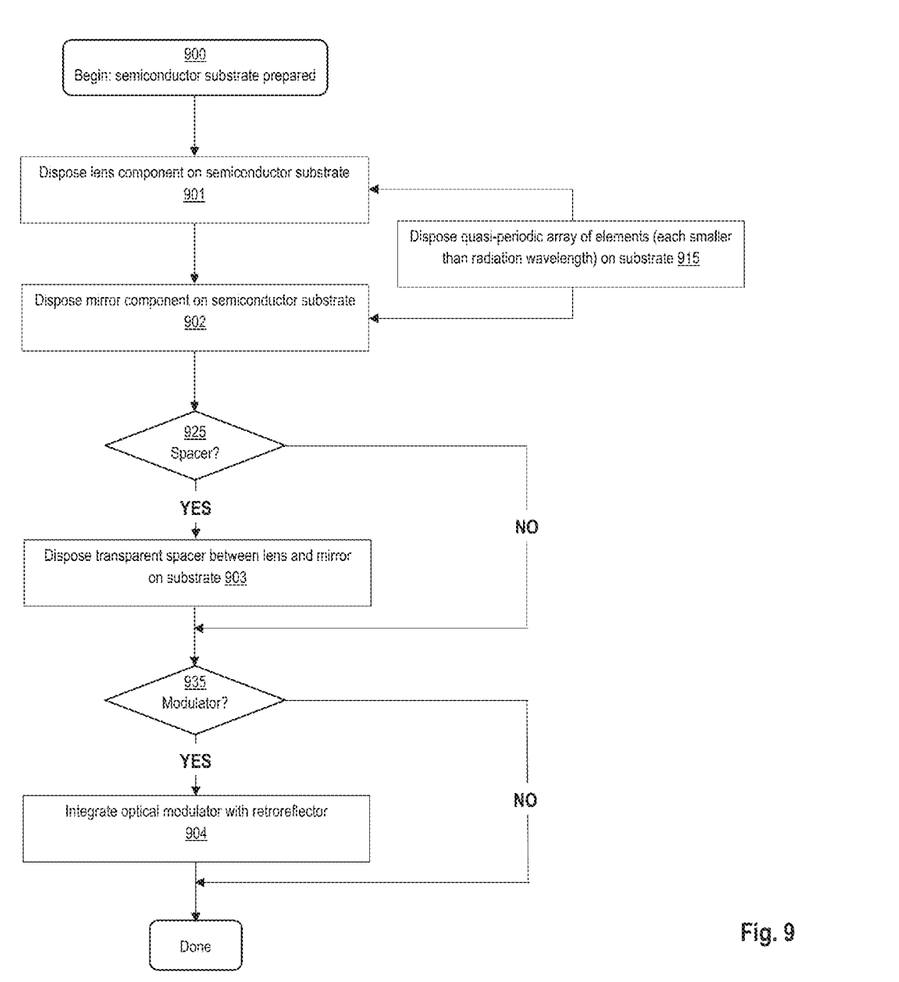
FIG. 9 depicts a flowchart for an example process for fabricating an optical retroreflector device, according to an embodiment of the present disclosure.

FIG. 9 depicts a flowchart for an example process 900 for fabricating an optical retroreflector device, according to an embodiment of the present disclosure. The example process 900 may represent a semiconductor fabrication process, which begins with preparation of a silicon substrate (or another flat). Example embodiments may be implemented in which the steps described herein may be performed in a variety of orders or sequences.

In step 901, a lens component is disposed on the semiconductor substrate. In step 902, a mirror component is disposed on the semiconductor substrate. Step 901 and/or step 902 may comprise, at least in part, a step 915 in which a quasi-periodic array (such as a lattice) of elements is disposed on the semiconductor array. Each of the elements of the array is smaller in its dimensions than wavelengths characterizing the range of optical operability of the retroreflector.

In step 925, a decision is made relative to whether the retroreflector device will include a spacer component. If so, then in step 903, an optically transparent spacer such as an epoxy based polymer (e.g., SU-8) or another transparent polymeric material is disposed between the mirror component and the lens component on the substrate. The spacer may be added before the lens, for example if the mirror is disposed on the substrate before the lens. Thus, steps 902 and 903 may precede step 901.

An example embodiment may also be implemented in which the lens is disposed on the substrate before the mirror and/or the spacer. Upon disposition of the transparent spacer between the lens and the mirror (or if no spacer is to be added, e.g., per step 925), then in step 935 a decision is made in relation to whether an optical modulator device is to be integrated with the retroreflector. If so, then in step 904, an optical modulator is integrated with the retroreflector.

The optical modulator may comprise a transmitter and/or a transceiver device, which is operable optically for performing amplitude modulation, phase modulation and/or polarization modulation. Example embodiments may be implemented in which the optical modulator is integrated externally in relation to the retroreflector device or internally thereto (e.g., within the transparent spacer or a low index material, which is disposed beneath the mirror in relation to the substrate).

Upon integration of the modulator (or if no modulator is to be integrated, e.g., per step 935), then process 900 may be complete. Example embodiments maybe implemented in which additional process steps characterize process 900. For example, a low refractive index material may be disposed between the mirror and the substrate. Other steps may relate to epitaxy, microlithography, chemical and/or mechanical treatment, electrical connection, packaging and/or backend processes, etc.

An example embodiment of the present disclosure has thus been described in relation to a process for fabricating an optical retroreflector device. The fabrication process may relate to disposing a retroreflector device on a silicon based substrate or another semiconductor substrate. In an example embodiment, the process for fabricating the retroreflector device may relate to a binary lithography process, implemented over a flat substrate surface. Retroflectors thus fabricated may be integrated with other optical components such as optical modulators.

An example embodiment is described in relation to a retroreflector that can be mass produced using conventional micro-fabrication techniques and binary lithography. The proposed retroreflector has a low profile and weight, is fabricated on a flat substrate, and can be readily integrated with other components such as optical modulators. As described above, a retroreflector is implemented to comprise a flat lens and a flat mirror separated from each other by a transparent spacer layer. The lens and the mirror comprise high contrast gratings and are implemented by gradually changing the geometrical parameters of a two dimensional periodic structure [Ref. 3, 4].

The periodic structure is patterned on a layer of material with high refractive index surrounded by lower refractive index materials. The lens and the mirror realized by gradually changing the diameters of circular silicon posts arranged in a hexagonal lattice. The retroreflector may comprise periodic structures made of silicon posts arranged in a hexagonal lattice and resting on a 5 um thick silicon dioxide membrane. To find the phase and amplitude of reflection and transmission coefficients for a plane wave incident normal to such a periodic structure, example numerical simulations compute a rigorous coupled mode analysis.

Figure 10:
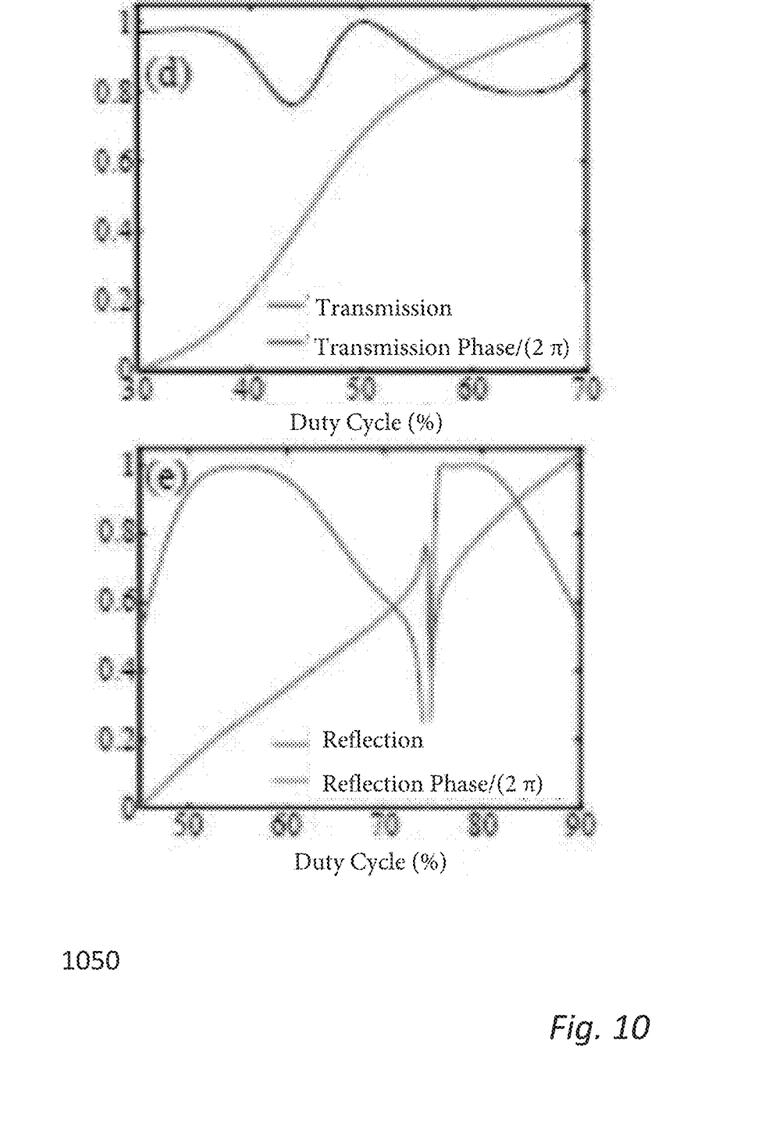
FIG. 10 depicts transmission and reflection amplitude and phase computed in relation to a corresponding example periodic structure, according to an embodiment of the present disclosure.

FIG. 10 depicts transmission and reflection amplitude and phase computed in relation to a corresponding example periodic structure, according to an embodiment of the present disclosure. The transmission amplitude and phase 1000 corresponding to an example periodic structure with the lattice constant of 1 µm and post height of 1.3 µm as a function of the duty cycle (ratio of the post diameter to the lattice constant) at the design wavelength of $\lambda=2$ µm. For the example post height, the periodic structure is mostly transmissive and the transmission phase can be controlled by varying the duty cycle between 30% and 70%. By changing the radii of the posts gradually, a structure is obtained whose local transmission phases may be approximated by those of the periodic structure of the same parameters.

Using this periodic structure, an example embodiment implements a parabolic phase mask, which focuses the light similar to a convex lens. A similar plot 1050 shows the reflection amplitude and phase of the same example periodic structure but with a different post height of $h=0.7$ µm. This periodic structure is mostly reflective and the reflection phase spans a full $2\pi$ range. As seen with reference to plot 1050, the reflectivity goes down around the duty cycle value of 75%.

An example embodiment is implemented in which duty cycles close to that range are excluded, and in which a reflective phase mask behaves as a concave mirror with a focal length of f m=20 µm. The focal length of the lens f1=40 µm is roughly equal to the radius of curvature of the concave mirror. The separation between the lens and the mirror $d=38.5$ µm is approximately equal to the focal length of the lens and is adjusted to maximize the optical power reflected back along the incident direction. Light is focused by the lens at the mirror's plane and is reflected back by the mirror along the incident angle.

An example embodiment has thus been described in relation to a retroreflector device. The retroreflector comprises a lens component operable for focusing radiation, which is incident thereto at an angle of incidence. The retroreflector also comprises a mirror component operable for reflecting the radiation focused by the lens component back along the angle of incidence. The lens component and/or the mirror component comprise a quasi-periodic array of elements, each of which comprises a dimension smaller than a wavelength of the radiation.

In an example embodiment, the retroreflector further comprises a modulator component integrated therewith, e.g., monolithically or with a hybrid technique. The modulator component is operable for performing a function as a transmitter and/or a transceiver. The modulator component may be disposed externally or internally in relation to the retroreflector device with which it is integrated. The modulator component may be operable for performing a modulation function, which relates to amplitude modulation, phase modulation and/or polarization.

In an example embodiment, the lens component and/or the mirror component are disposed on a semiconductor substrate such as silicon. An example embodiment may implement a retroreflector device that is operable optically over a range of wavelengths corresponding to an infrared spectral range. The flat substrate.

The optical operating range of the retroreflector device comprises a range of wavelengths over which the retroreflector functions efficiently. The optical operating range relates to a parameter characteristic of the lens component and/or the mirror component. The parameter of the lens and/or mirror may relate to a size and/or a shape of a lattice associated with the one or more of the lens component or the mirror component.

The parameter of the lens and/or mirror may relate to a size and/or a shape of each of multiple unit elements, which comprise the lattice. The retroreflector may be operable over one or more frequency ranges of the electromagnetic spectrum (e.g., radio, microwave, Terahertz, infrared, visible, ultraviolet, and/or an x-ray). An example embodiment is also described in relation to a method for fabricating a retroreflector.

A flat retroreflector in a cat's eye configuration focuses the light using a lens. The focused light is reflected back off a focusing flat mirror. The focusing lens is flat and is composed of a quasi-periodic array of materials with high refractive index surrounded by materials of lower refractive index. The flat mirror is also composed of a quasi-periodic array of materials with high index contrast compared to its surroundings.

In an example embodiment of the present disclosure, a retroreflector that reflects back a portion of the incident radiation along the incident angle and is composed of a lens and a mirror that at least one of them is realized using a quasi-periodic array of sub-wavelength elements.

In an example embodiment, a retroreflector modulator transmitter and/or transceiver uses and/or is integrated with the retroreflector. In an example embodiment, the modulator is located outside of the retroreflector. In an example embodiment, the modulator is integrated either monolithically or using hybrid integration techniques with the retroreflector. In an example embodiment, the modulator may also comprise an integral part of the retroreflector.

In an example embodiment, the retroreflector is operable in the infrared spectral range or another spectral range, without limitation. In an example embodiment, the retroreflector may be disposed on a semiconductor substrate such as silicon or another semiconductor.

An example embodiment of the present disclosure has also been described in relation to an optical apparatus. The optical apparatus comprises a retroreflector device disposed on a semiconductor substrate having a high refractive index in relation to a range of frequencies over which the optical apparatus is efficient operationally. The apparatus' retroreflector device comprises a lens component operable for focusing radiation, which is incident thereto at an angle of incidence.

The retroreflector device also comprises a mirror component operable for reflecting the radiation focused by the lens component back along the angle of incidence. The lens component or the mirror component of the retroreflector comprises a quasi-periodic array of elements, each of which comprises a dimension smaller than a wavelength of the radiation within the operationally efficient wavelength range.

The apparatus' retroreflector device also comprises a spacer component, which is transparent over the operationally efficient wavelength range and disposed between the lens component and the mirror component thereof. The retroreflector may further comprise a material, which has a low refractive index in relation to the operationally efficient wavelength range and is disposed over the semiconductor substrate beneath the mirror component in relation to the lens component.

The optical apparatus also comprises an optical modulator transceiver or transmitter device integrated with the retroreflector device and operable over the operationally efficient wavelength range for performing one or more of amplitude, phase, or polarization related modulation of the incident radiation. The optical modulator device may be integrated with the retroreflector device monolithically or using hybrid integration. The modulator may be disposed externally in relation to the retroflector or internally (e.g., within the transparent spacer or low index components).

An example embodiment thus implements retroflectors, such as those of the cat's eye type or related varieties, which have a focusing lens or unit elements thereof comprising an array of various sizes and/or shapes of lattice structures or unit elements thereof and are disposed over a semiconductor substrate. The retroreflectors have high reflection efficiencies and are quickly and easily applied over a surface.

In an example embodiment, the retroreflector is integrated with an optical modulator, e.g., as a component of a remote transceiver and/or transmitter, which may be mounted on a satellite, an aircraft or another vehicle or used in various other applications. The size, weight, form factor and other features of the retroflector allow integration with the optical modulator.

Thus, example embodiments of the present disclosure have been described in relation to a retroreflector device. The retroreflector comprises a lens component operable for focusing radiation, which is incident thereto at an angle of incidence. The retroreflector also comprises a mirror component operable for reflecting the radiation focused by the lens component back along the angle of incidence. The lens component and/or the mirror component comprise a quasi-periodic array of elements, each of which comprises a dimension smaller than a wavelength of the radiation.

Example embodiments of the present disclosure are thus described in relation to retroreflectors. In the foregoing specification, example embodiments have been described with reference to numerous specific details that may vary from one implementation to another. Thus, the sole and exclusive indicator of what is the invention, and is intended by the applicants to be the invention, is the set of claims that issue from this application, in the specific form in which such claims issue, including any subsequent correction.

Any definitions expressly set forth herein for terms contained in such claims shall govern the meaning of such terms as used in the claims. Thus, no limitation, element, property, feature or attribute that is not expressly recited in a claim should limit the scope of such claim in any way. The specification and drawings are, accordingly, to be regarded in an illustrative rather than a restrictive sense.

LIST OF REFERENCES

The following references are incorporated by reference.

[1] W. S. Rabinovich, et al., "InGaAs multiple quantum well modulating retro-reflector for free-space optical communications," in Proc. SPIE Free-Space Laser Communications Imaging, vol. 4489, D. G. Voelz and J. C. Ricklin, Eds., pp. 190-201, (2002)

[2] W. S. Rabinovich, et al., "A cat's eye multiple quantum-well modulating retro-reflector," IEEE Photon. Technol. Lett., vol. 15, no. 3, pp. 461-463, March (2003).

[3] D. Fattal, J. Li, Z. Peng, M. Fiorentino, and R. G. Beausoleil, "Flat dielectric grating reflectors with focusing abilities," Nature Photon. 4, 466-470 (2010).

[4] F. Lu, F. G. Sedgwick, V. Karagodsky, C. Chase, and C. J. Chang-Hasnain, "Planar high-numerical-aperture low-loss focusing reflectors and lenses using subwavelength high contrast gratings," Opt. Express 18, 12,606-12,614 (2010).

What is claimed is:

1. A retroreflector device, comprising:
a lens component operable for focusing radiation, which is incident thereto at an angle of incidence; and
a mirror component operable for reflecting the radiation focused by the lens component back along the angle of incidence,
wherein one or more of the lens component or the mirror component comprises a quasi-periodic array of elements, each of which comprises a dimension smaller than a wavelength of the radiation.

2. The retroreflector device as described in claim 1, further comprising a modulator component integrated therewith.

3. The retroreflector device as described in claim 2 wherein the modulator component is operable for performing at least one of a transmitter related functionality or a transceiver related functionality.

4. The retroreflector device as described in claim 2 wherein the modulator component is disposed externally in relation to the retroreflector device with which it is integrated.

5. The retroreflector device as described in claim 2 wherein the modulator component is disposed internally in relation to the retroreflector device with which it is integrated.

6. The retroreflector device as recited in claim 2 wherein the modulator component is integrated therewith monolithically.

7. The retroreflector device as recited in claim 2 wherein the modulator component is integrated therewith using a hybrid technique.

8. The retroreflector device as recited in claim 2 wherein the modulator component is operable for performing a modulation function, which comprises one or more of:
an amplitude related modulation functionality;
a phase related modulation functionality; or
a polarization related modulation functionality.

9. The retroreflector device as recited in claim 1 wherein one or more of the lens component or the mirror component are disposed on a semiconductor substrate.

10. An optical apparatus, comprising:
a retroreflector device disposed on a semiconductor substrate, the retroreflector device comprising:
a lens component operable for focusing radiation, which is incident thereto at an angle of incidence;
a mirror component operable for reflecting the radiation focused by the lens component back along the angle of incidence,
wherein one or more of the lens component or the mirror component comprises a quasi-periodic array of elements, each of which comprises a dimension smaller than a wavelength of the radiation within the operationally efficient wavelength range;
a spacer component, which is transparent over the operationally efficient wavelength range and disposed between the lens component and the mirror component;
a material, which has a low refractive index in relation to the operationally efficient wavelength range and is disposed over the semiconductor substrate beneath the mirror component in relation to the lens component; and
an optical modulator transceiver or transmitter device integrated with the retroreflector device and operable over the operationally efficient wavelength range for performing one or more of amplitude, phase, or polarization related modulation of the incident radiation.

11. The optical apparatus as recited in claim 10 wherein the device is operable optically over a range of wavelengths corresponding to an infrared spectral range.

12. The optical apparatus as recited in claim 11 wherein:
the substrate material comprises silicon; and
the low refractive index material disposed thereon beneath the mirror component comprises silicon dioxide.

13. The optical apparatus as recited in claim 10 wherein the operationally efficient wavelength range relates to a characteristic of one or more of the lens component or the mirror component.

14. The optical apparatus as recited in claim 13 wherein the characteristic of the one or more of the lens component or the mirror component relates to a parameter associated with the quasi-periodic array of thereof.

15. The optical apparatus as recited in claim 14 wherein the parameter associated with the quasi-periodic array comprises one or more of:
at least one of a size or a shape of a lattice feature of the quasi-periodic array; or
at least one of a size or a shape of one or more of a plurality of unit elements, which comprise the lattice.

16. The optical apparatus as recited in claim 10 wherein the retroreflector is optically operable over one or more frequency ranges of the electromagnetic spectrum.

17. The optical apparatus as recited in claim 16 wherein the one or more frequency ranges correspond to at least one of a radio, a microwave, a Terahertz, an infrared, a visible and/or an ultraviolet, or an x-ray related wavelength.

18. A method of fabricating an optical retroreflector device, the method comprising:
disposing a lens component on a semiconductor substrate, wherein the lens component is operable for focusing radiation, which is incident thereto at an angle of incidence; and
disposing a mirror component on the semiconductor substrate, herein the mirror component is operable for reflecting the radiation focused by the lens component back along the angle of incidence,
wherein one or more of the disposing the lens component or the disposing the mirror component comprises disposing a quasi-periodic array of elements, each of which comprises a dimension smaller than a wavelength of the radiation,
wherein an optical operating range of the retroreflector device relates to a parameter characterizing one or more of the lens component or the mirror component, and
wherein the parameter of the one or more of the lens component or the mirror component relates to one or more of:
at least one of a size or a shape of a lattice associated with the one or more of the lens component or the mirror component; or
at least one of a size or a shape of each of a plurality of unit elements, which comprise the lattice.

19. The method as recited in claim 18, further comprising one or more of:
disposing an optically transparent spacer component between the lens component and the mirror component on the semiconductor substrate; or
integrating an optical modulator component with the retroreflector device.

* * * * *